(12) United States Patent
Nerone

(10) Patent No.: US 6,411,045 B1
(45) Date of Patent: Jun. 25, 2002

(54) LIGHT EMITTING DIODE POWER SUPPLY

(75) Inventor: Louis R. Nerone, Brecksville, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/736,994

(22) Filed: Dec. 14, 2000

(51) Int. Cl.[7] ............................................. H05B 37/00
(52) U.S. Cl. ................ 315/291; 315/185 R; 315/200 R
(58) Field of Search ...................... 315/209 R, 224, 315/291, 219, 307, 200 A, 200 R, 185 S, 185 R, 241 P; 362/800

(56) References Cited

U.S. PATENT DOCUMENTS

| | | | |
|---|---|---|---|
| 4,271,408 A | 6/1981 | Teshima et al. | 340/702 |
| 4,298,869 A | 11/1981 | Okuno | 362/800 |
| 4,800,329 A | 1/1989 | Masaki | 323/242 |
| 4,800,330 A | 1/1989 | Pelonis | 323/243 |
| 4,835,649 A | 5/1989 | Salerno | 361/18 |
| 4,910,654 A | 3/1990 | Forge | 363/49 |
| 4,954,822 A | 9/1990 | Borenstein | 362/800 |
| 4,959,556 A | 9/1990 | Dekker et al. | 307/261 |
| 5,410,466 A | * 4/1995 | Maehara | 315/224 |
| 5,457,450 A | 10/1995 | Deese et al. | 362/800 |
| 5,636,057 A | 6/1997 | Dick et al. | 359/625 |
| 5,663,719 A | 9/1997 | Deese et al. | 362/800 |
| D388,726 S | 1/1998 | Wu | D10/115 |
| 5,917,289 A | 6/1999 | Nerone et al. | 315/209 R |
| 5,936,599 A | 8/1999 | Reymond | 345/82 |
| 5,945,783 A | * 8/1999 | Schultz et al. | 315/224 |
| 6,019,493 A | 2/2000 | Kuo et al. | 362/800 |
| D421,929 S | 3/2000 | Hernandez | D10/115 |
| 6,036,336 A | 3/2000 | Wu | 362/800 |
| 6,144,568 A | * 11/2000 | Franck et al. | 315/224 |

* cited by examiner

*Primary Examiner*—Don Wong
*Assistant Examiner*—Wilson Lee
(74) *Attorney, Agent, or Firm*—Fay, Sharpe, Fagan, Minnich & McKee, LLP

(57) ABSTRACT

A space efficient circuit arrangement for supplying power to an LED array, the power supply circuit (100) has a rectifier (105), a starting circuit coupled to the rectifier (105), a gate drive arrangement coupled to the starting circuit, and a resonant converter circuit (120, 125) coupled between the rectifier (105) and a resonant load circuit (135). The resonant load circuit includes a resonant inductance (150), a resonant capacitance (155) coupled to the resonant inductance (150), and a load connected in parallel to the resonant capacitance (155). A plurality of light emitting elements (170, 175) and a capacitor (160) define at least a portion of the load. All of the circuit components may be placed on the same circuit board as the light emitting elements (170, 175), thereby taking up less space in a traffic signal housing and making retrofitting a traditional incandescent lamp traffic signal easier.

17 Claims, 4 Drawing Sheets

LIGHT EMITTING DIODE POWER SUPPLY

BACKGROUND OF THE INVENTION

1. Field of the Invention

This application relates to an electrical circuit and, in particular, to a power supply circuit for operating a light source, particularly, an array of light emitting diodes (LEDs).

2. Discussion of the Art

Incandescent lamps are used in a wide variety of environments and generally have found substantial commercial success in meeting various demands. More recently, however, industry is seeking an alternative light source that is more efficient, has an extended life, and can endure the rigors of applications that experience constant exposure to the elements and frequent on/off switching. An exemplary use of an incandescent lamp in this type of environment is in traffic signals. While incandescent lamps have traditionally been used in traffic signals, the incandescent lamp encounters constant exposure to the elements and has a relatively short life span of typically around eight thousand hours, which is further shortened if it is frequently switched on and off. Additionally, the incandescent lamp is inefficient due to the fact that much of the light energy produced by it is wasted by filtering the light. As a result, traffic signals utilizing incandescent lamps require frequent maintenance and typically must be replaced once or twice a year.

Light emitting diodes (LEDs) have been suggested as alternative light sources due to their robust structure that are able to withstand constant exposure to the elements and the long life associated with their efficient operation. Known advantages of using an LED array in lieu of an incandescent lamp include increased efficiency, little or no maintenance, greater resistance to the elements, and greater mechanical durability.

Additionally, an LED array consumes less power to produce the same light output as an incandescent lamp. Further advantages are that an LED array may function for more than twenty years before requiring replacement, an LED array does not require a light reflector, and a fault in the LED array does not necessarily mean that the entire LED array will fail. In addition to performing the same functions as an incandescent lamp, a single LED array may also be used to display different illuminated symbols such as "no left turn", "turn only", and "do not enter".

Despite all of these advantages, however, there are still several concerns which have prevented widespread adoption of LED arrays in, for example, traffic signals. The most significant is that an LED array is not easily retrofitted. In the environment of traffic signals, incandescent lamps typically operate with a 120 volt 60 Hz AC power supply, and LEDs typically require a DC current of approximately 5 to 20 milliamps and a forward operating voltage of between 1.5 to 2.5 volts. Second, "standard" incandescent lamp traffic signal housings are designed to accept a "standard" incandescent bulb.

While these issues have been addressed in the prior art, the known solutions have raised other issues. For example, retrofitting an existing incandescent lamp traffic signal using only an inductor or L-C circuit connected to LED pairs connected in series presents a significant problem since the required inductor for an array of approximately twenty LEDs is 6 Henries. An inductor of this size is very heavy, making the LED assembly much heavier than a traditional incandescent lamp assembly. Thus, a pole or electrical line to which a traffic signal is mounted must be sufficient to support the increased weight for the long duration. Accommodations for an enlarged inductor must also be made in the traffic signal housing, along with attendant difficulties regarding installing, maintaining, or retrofitting the LED array in the limited space of a standard incandescent lamp traffic signal. Needs of a technician working in a bucket ladder high above the ground must also be considered in such a design.

Accordingly, a need exists for an alternative manner of supplying power to LED arrays, particularly those used in traffic signals.

BRIEF SUMMARY OF THE INVENTION

The present invention provides a more cost efficient electrical circuit for supplying power to an LED array.

A power supply circuit for an LED array includes a rectifier for converting an AC current to DC current; a starting circuit coupled to the rectifier for providing a path for the AC current; a gate drive arrangement coupled to the starting circuit; a resonant converter circuit regeneratively controlled by the gate drive arrangement; and a resonant load circuit coupled to the resonant converter circuit for inducing the AC current in the resonant load circuit. The resonant load circuit incorporates a resonant inductance, a resonant capacitance coupled to the resonant inductance, and a load connected in parallel to the resonant capacitance.

A plurality of light emitting elements and a capacitor define at least a portion of the load.

In other preferred embodiments, the load includes at least one pair of oppositely polarized light emitting elements connected in parallel or at least one pair of oppositely polarized branches of light emitting elements.

This circuit has a number of advantages over the prior art. The power supply circuit uses smaller components and decreases the space requirements in the electrical compartment of a traffic signal than any known prior art circuit.

Another advantage resides in the use of integrated circuits which weigh less and provide for easier placement in traffic signals.

Still another advantage is realized since integrated circuits will fit on the same circuit board as the LED array.

DETAILED DESCRIPTION OF THE PREFERRED EMBODIMENTS

Figure 1:
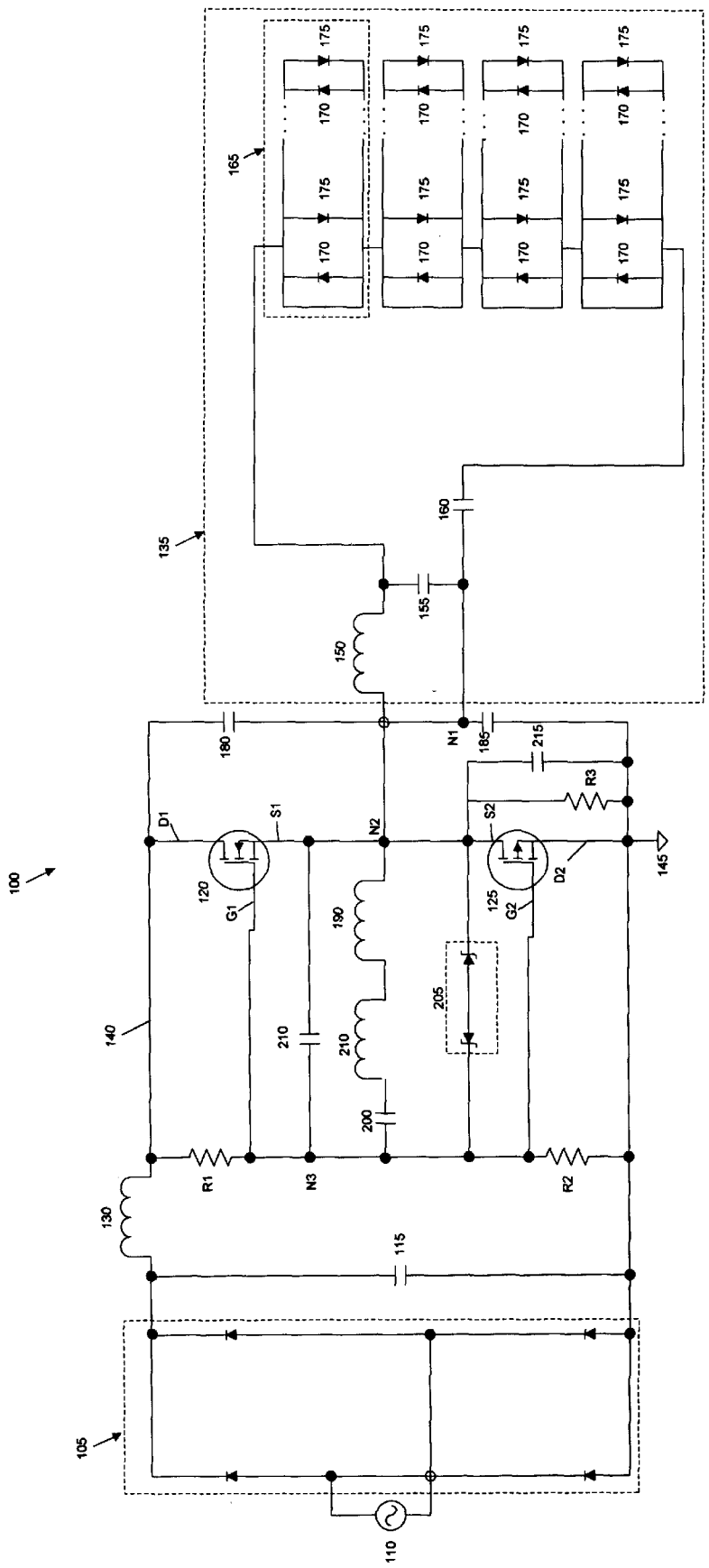
FIG. 1 is a schematic diagram of an exemplary embodiment of a power supply circuit according to the present invention.

FIG. 1 depicts a power supply circuit 100 for an LED traffic signal in accordance with a first preferred embodiment of the present invention. A first rectification means or full-wave bridge rectifier 105 coupled to an AC source 110 converts an AC current to DC current. A smoothing capacitor 115, connected in parallel to the bridge rectifier 105 maintains an average voltage level. A DC-to-AC converter, which includes first and second switches 120 and 125, is coupled to the smoothing capacitor 115. An electromagnetic interference (EMI) filter 130, shown as an inductor, is coupled between the bridge rectifier 105 and the DC-to-AC converter.

The first and second switches 120 and 125 are respectively controlled by a gate drive circuit to convert DC current from the output of the bridge rectifier 105 to AC current received by a resonant load circuit 135. DC bus voltage $V_{BUS}$ exists between a bus conductor 140 and a reference conductor 145, shown for convenience, as a ground.

The resonant load circuit 135 includes a resonant inductor 150 and a resonant capacitor 155. The resonant load circuit 135 also includes a load. The load includes a matching capacitor 160 and at least one group 165 of LEDs 170, 175 connected in series. The LEDs 170, 175 are preferably oppositely polarized in a manner well known in the art. The LEDs 170, 175 are disposed in parallel so that the LEDs 170, 175 encounter the same electric potential, and each diode is illuminated during each half cycle. The group 165 of LEDs 170, 175 may be shunted across the resonant capacitor 155. The matching capacitor 160, which affects how the resonant inductor 150 and resonant capacitor 155 network perceives the impedance of the LEDs 170, 175, is coupled between a node NI and the group 165 of LEDs 170, 175. The matching capacitor 160 may limit the current through the LEDs.

Capacitors 180, 185 are standard bridge capacitors for maintaining their connection node N1 at about one half the bus voltage $V_{BUS}$. Arrangements alternative to the bridge capacitors 180, 185 are known in the art. Other arrangements for interconnecting the LEDs 170, 175 in the resonant load circuit 135 will be discussed further below.

In the power supply circuit 100, the first and second switches 120 and 125 are complementary to each other. For instance, the first switch 120 may be an n-channel enhancement mode device as shown, and the second switch 125 is a p-channel enhancement mode device, also known as MOSFET switches. However, other n-channel, p-channel or bipolar junction transistor switches may be used. Each of the first and second switches 120 and 125 has a respective gate (or control terminal) G1, G2, respectively. The voltage from the gate G1 to source (reference terminal) S1 of the first switch 125 controls the conduction state of that switch. Similarly, the voltage from the gate G2 to source S2 of the second switch 125 controls the conduction state of that switch. As illustrated, the sources Si and S2 are connected together at a common node N2. Drains D1 and D2 of the first and second switches 120 and 125 are connected to the bus conductor 140 and the reference conductor 145, respectively.

The gate drive circuit is connected between the common control node N3 and the common node N2. The gate drive circuit includes a driving inductor 190 which is mutually coupled to the resonant inductor 150 in such a manner that a voltage induced therein is proportional to the instantaneous rate of change of an AC load current. The driving inductor 190 is further connected at one end to the common node N2. The end of the resonant inductor 150 connected to the common node N2 may be a tap from a transformer winding forming the driving inductor 190 and the resonant inductor 150. The driving inductor 190 provides the driving energy for operation of the gate drive circuit. A second inductor 195 is serially connected to the driving inductor 190 between a blocking capacitor 200 and the driving inductor 190. The second inductor 195 is used to adjust the phase angle of the gate-to-source voltage appearing between the common control node N3 and the common node N2.

A bi-directional voltage clamp 205, preferably comprised of back-to-back Zener diodes, is located between the common control node N3 and the common node N2. The bi-directional voltage clamp 205 advantageously clamps positive and negative excursions of gate-to-source voltage ratings of the first and second switches 120 and 125 so that their gate-to-source maximum ratings are not exceeded. The bi-directional voltage clamp 205 may be removed from the power supply circuit 100 when the gate drive circuit is at a sufficiently low value.

A capacitor 210 between the control node N3 and the common node N2 is preferably provided to predictably limit the rate of change of gate-to-source voltage between the common control node N3 and the common node N2. This beneficially assures, for instance, a dead time interval in the switching modes of the first and second switches 120 and 125, wherein the first and second switches 120 and 125 are off between the times of either the first switch 120 or the second switch 125 being turned on. The capacitor 210 also provides a second resonant circuit consisting of the capacitor 210 and the second inductor 195.

The blocking capacitor 200 and three resistors R1, R2, and R3, forming a starting circuit, are coupled to the gate drive circuit. The starting circuit provides a path for input from AC source 110 to start inductor action. The starting circuit operates as follows. The blocking capacitor 200 becomes initially charged upon energizing of the AC source 110 via resistors R1, R2, and R3. At this instant, the voltage across the blocking capacitor 200 is zero. During the starting process, the driving inductor 190 and the resonant inductor 150 act essentially as a short circuit due to the relatively long time constant for charging of the blocking capacitor 200. Upon initial bus energizing, the voltage on the common node N2 is approximately ⅓ of the bus voltage $V_{BUS}$ with the resistors R1, R2, and R3 being of equal value, for instance. The voltage at the common control node N3, between the resistors R1, R2, R3 is ½ of the bus voltage $V_{BUS}$. In this manner, the blocking capacitor 200 becomes increasingly charged, from left to right, until it reaches the threshold voltage of the gate-to-source voltage of the first switch 120 (e.g., 2–3 volts). At this point, the first switch 120 switches into its conduction mode, which then results in current being supplied by the first switch 120 to the resonant load circuit 135. In turn, the resulting current in the resonant load circuit 135 causes regenerative control of the first and second switches 120 and 125 in the manner described above.

During steady state operation of the power supply circuit 100, the voltage of common node N2 between the first and second switches 120 and 125 becomes approximately ½ of the bus voltage $V_{BUS}$. The voltage at the common control node N3 also becomes approximately ½ of the bus voltage $V_{BUS}$ so that the blocking capacitor 200 cannot again become charged and create another starting pulse for turning on the first switch 120. The capacitive reactance of the blocking capacitor 200 is much smaller than the inductive reactance of the driving inductor 190 and the second inductor 195 so that the blocking capacitor 200 does not interfere with operation of the driving inductor 190 and the second inductor 195.

Thus, the starting circuit of the power supply circuit 100 does not require a triggering device, such as a diac, which is traditionally used for starting circuits. Additionally, the resistors R1, R2 and R3 are non-critical value components, which may be 100K ohms or 1 M ohm each, for example. Preferably, the values of the resistors R1, R2, and R3 are approximately equal.

An optional snubber capacitor 215 may be employed to deplete the energy in the resonant inductor 150. The snubber capacitor 215 is coupled in parallel to the resistor R3. While it is shown that the resistor R3 shunts the second switch 125, the resistor R3 may shunt the first switch 120.

Figure 2:
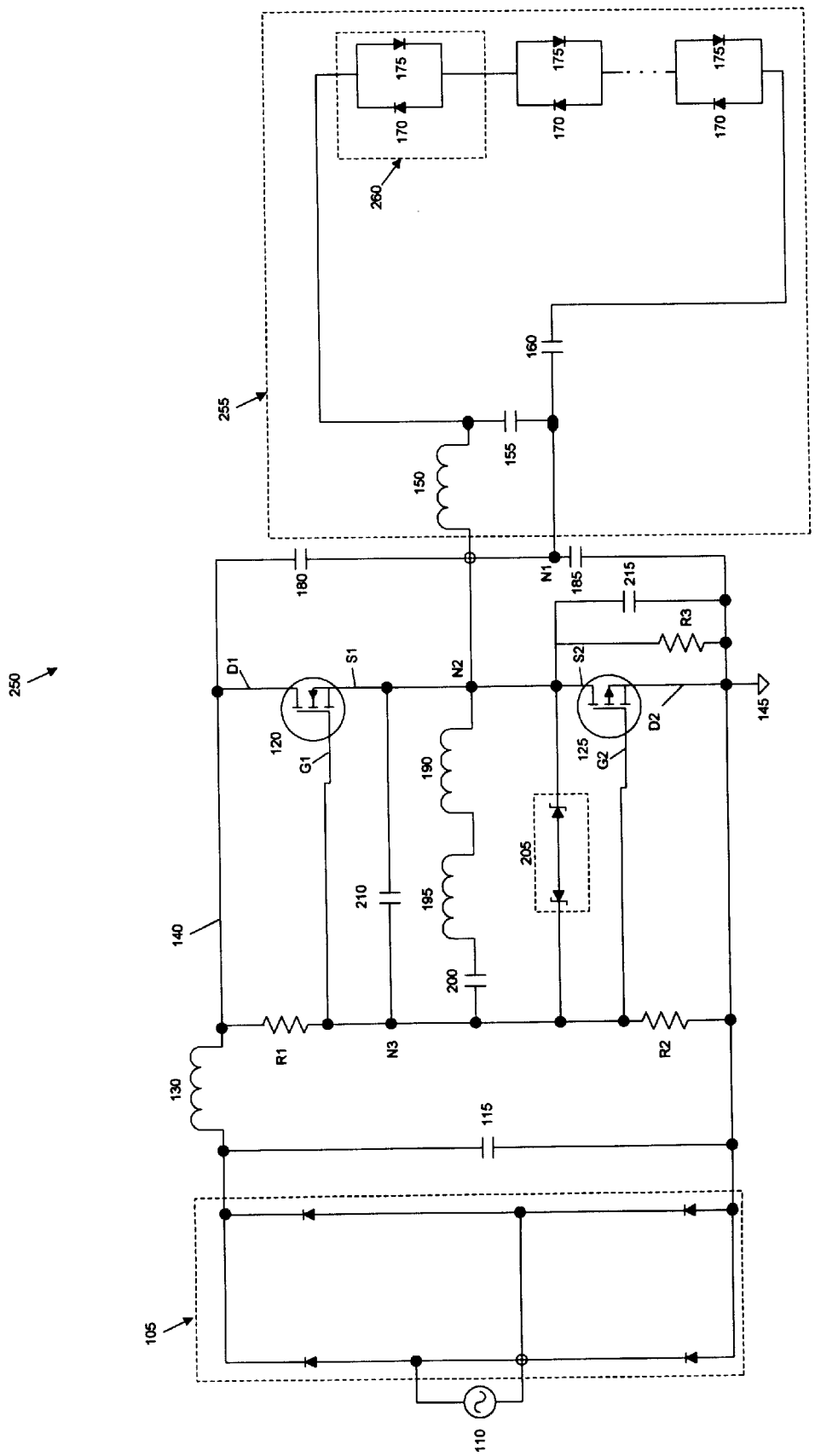
FIG. 2 is a schematic diagram of a second preferred embodiment of a power supply circuit according to the present invention.

FIG. 2 depicts a power supply circuit 250 for an LED traffic signal in accordance with a second preferred embodiment of the present invention. The power supply circuit 250 is identical to the power supply circuit 100 of FIG. 1, with the exception of the arrangement of the LEDs 170, 175 in the resonant load circuit 100. Thus, the power supply circuit 250 offers the same benefits and advantages as the power supply circuit 100.

In the power supply circuit 250, the resonant load circuit 255 includes the resonant inductor 150, the resonant capacitor 155, and the matching capacitor 160. The LEDs 170, 175 are arranged such that at least one pair 260 of oppositely polarized LEDs 170, 175 is connected in parallel.

Figure 3:
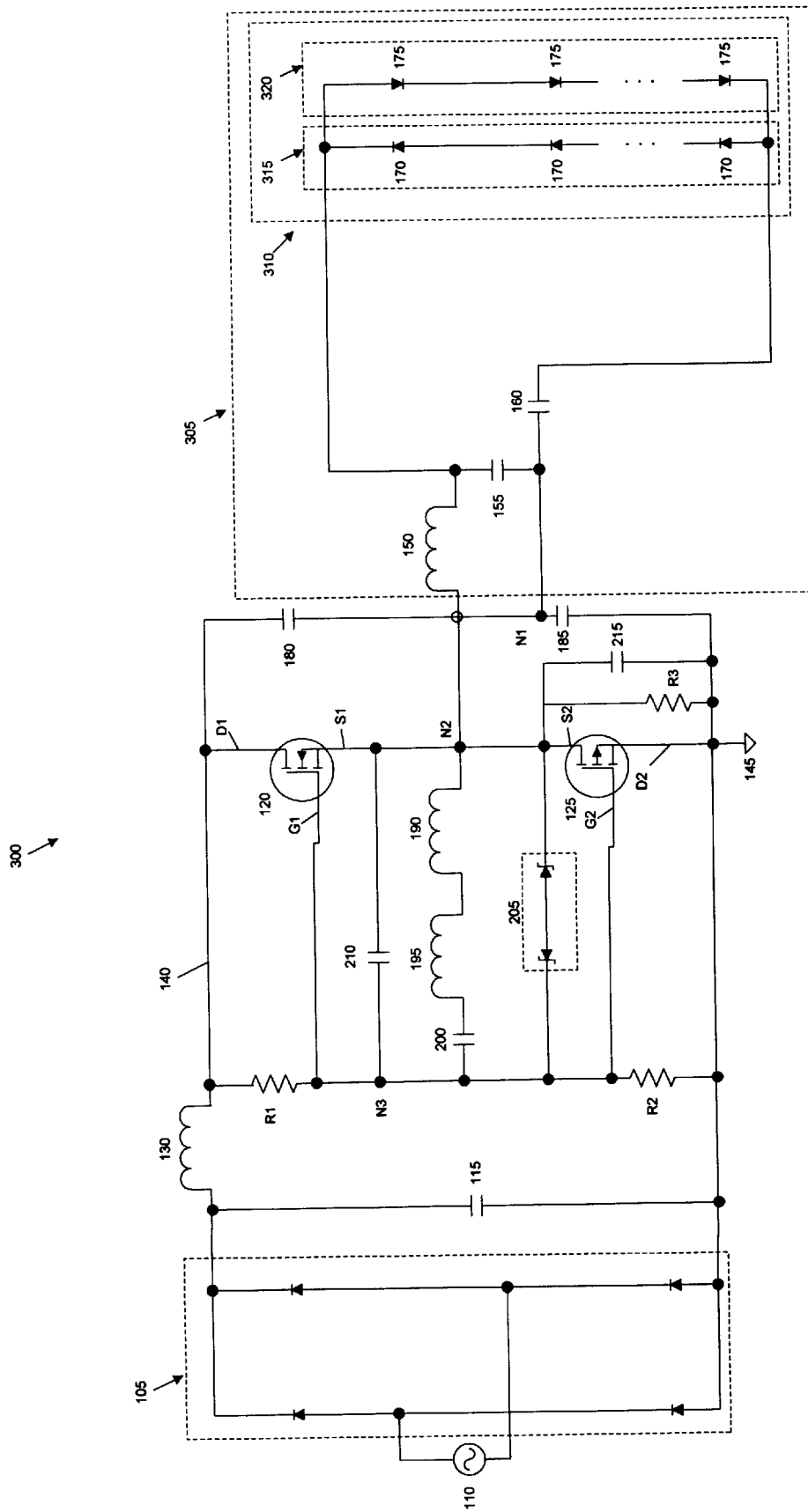
FIG. 3 is a schematic diagram of a third preferred embodiment of a power supply circuit according to the present invention.

FIG. 3 depicts a power supply circuit 300 for an LED traffic signal in accordance with a third preferred embodiment of the present invention. The power supply circuit 300 is identical to the power supply circuit 100 of FIG. 1, with the exception of the arrangement of the LEDs 170, 175. Thus, the power supply circuit 300 offers the same benefits and advantages as the power supply circuits 100 and 250 described above. In this arrangement, however, the power supply circuit 300 does not require an equal number of LEDs 170, 175.

In the power supply circuit 300, resonant load circuit 305 includes the resonant inductor 150, the resonant capacitor 155, and the matching capacitor 160. The LEDs 170, 175 are arranged such that at least one pair 310 of branches 315, 320 of LEDs 170, 175 are oppositely polarized and connected in parallel. Each branch 315 or 320 may contain an unlimited number of LEDs 170 or 175 polarized the same way. While it is preferred that each oppositely polarized branch 315 or 320 contains an equal number of LEDs 170 or 175, having an uneven number of LEDs 170 or 175 is acceptable as long as the voltage across each oppositely polarized branch 315 or 320 of LEDs 170 or 175 is substantially the same. The matching capacitor 160 accounts for any imbalance in the voltage between the branches 315, 320. However, the uneven distribution of the LEDs 170 or 175 between the branches 315, 320 is limited by the reverse voltage allowed by the LEDs 170 or 175.

Figure 4:
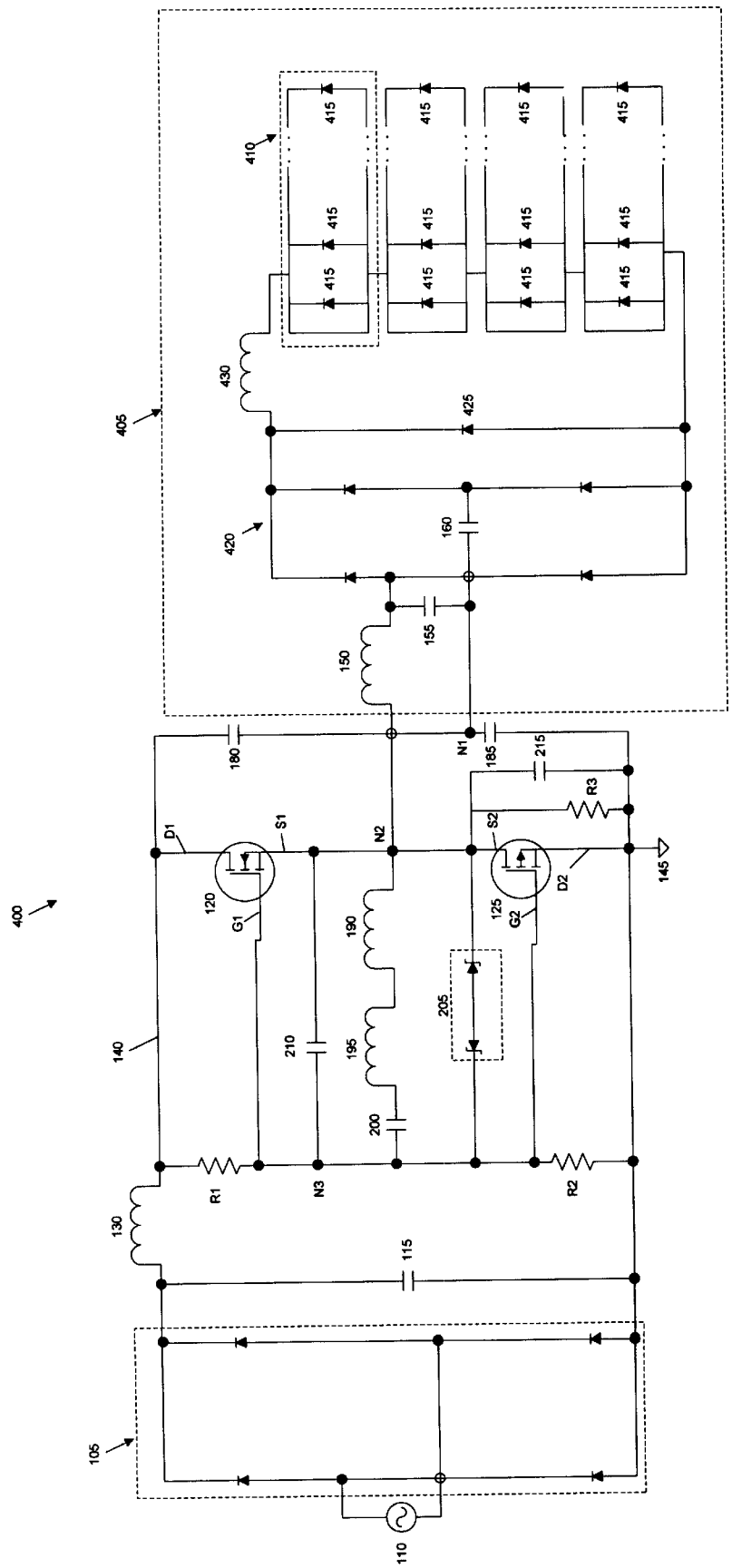
FIG. 4 is a schematic diagram of yet another preferred embodiment of a power supply circuit according to the present invention.

FIG. 4 depicts another power supply circuit 400 for an LED traffic signal. The power supply circuit 400 is identical to the power supply circuit 100 of FIG. 1, with the exception of the resonant load circuit 405. As in the resonant load circuit 135 described above, the resonant load circuit 405 comprises the resonant inductor 150, the resonant capacitor 155, and the matching capacitor 160. The resonant circuit further includes at least one group 410 of LEDs 415 connected in parallel and polarized in the same direction. The groups 410 of the LEDs 415 are connected in series. Because the LEDs 415 are polarized in the same direction, the resonant load circuit 405 requires three additional components, namely a second full-wave bridge rectifier 420, a diode 425, and a current limiting inductor 430.

The second bridge rectifier 420, which is coupled in parallel to the resonant capacitor 155, re-converts the AC current to DC current. The inductor 430 is coupled between the second bridge rectifier 420 and the LEDs 415. The LEDs 415 may be shunted across the resonant capacitor 155. The diode 425 is connected in parallel to the second bridge rectifier 420. The diode 425 allows current to flow continuously through the current limiting inductance 430, which limits the current supplied to the LEDs 430.

In summary, the present invention provides a manner of efficiently powering LEDs from an AC source using integrated circuit components. The invention minimizes the space required to retro-fit standard incandescent lamp traffic signals to LED traffic signals. The application of the invention is associated with an array of LEDs although it will be appreciated that the number of LEDs in a particular array may vary.

Furthermore, since numerous modifications and variations will readily occur to those skilled in the art, it is not desired that the present invention be limited to the exact construction and operation illustrated and described herein, and accordingly, all suitable modifications and equivalents which may be resorted to are intended to fall within the scope of the claims.

What is claimed is:

1. A power supply circuit, comprising:
   (a) a first rectifier for converting an AC current to DC current;
   (b) a starting circuit coupled to the first rectifier for providing a path for the AC current;
   (c) a gate drive arrangement coupled to the starting circuit;
   (d) a resonant converter circuit regeneratively controlled by the gate drive arrangement; and
   (e) a load circuit coupled to a resonant converter circuit for inducing the AC current in the load circuit, the load circuit, comprising:
      (1) a resonant inductance;
      (2) a resonant capacitance coupled to the resonant inductance; and
      (3) a load connected in parallel to the resonant capacitance, the load including,
         (i) a group of light emitting elements; and
         (ii) a capacitor coupled between the resonant capacitance and the group of the light emitting elements.

2. The circuit of claim 1, wherein the light emitting elements are light emitting diodes.

3. The circuit of claim 1, wherein the light emitting elements are connected in parallel.

4. The circuit of claim 1, wherein the light emitting elements are oppositely polarized.

5. The circuit of claim 1, wherein the light emitting elements are polarized in the same direction.

6. The circuit of claim 1, wherein the load further comprises:
   (a) a second rectifier for converting the AC current to DC current, the second rectifier coupled in parallel to the resonant capacitance;
   (b) a current limiting inductance coupled between the rectifier and the group of the light emitting elements; and
   (c) a diode coupled in parallel to the second rectifier, the second rectifier allowing the DC current to continuously flow through the current limiting inductance.

7. The circuit of claim 1, wherein the group is a pair of the light emitting elements oppositely polarized and connected in parallel.

8. The circuit of claim 1, wherein the group is a pair of branches of the light emitting elements of each branch polarized in the same direction.

9. A power supply circuit, comprising:
  (a) a first rectifier for converting an AC current to DC current;
  (b) a starting circuit coupled to the rectifier for providing a path for the AC current;
  (c) a gate drive arrangement coupled to the starting circuit;
  (d) a resonant converter circuit regeneratively controlled by the gate drive arrangement; and
  (e) a load circuit coupled to a resonant converter circuit for inducing the AC current in the load circuit, the load circuit, comprising:
    (1) a resonant inductance;
    (2) a resonant capacitance coupled to the resonant inductance; and
    (3) a load connected in parallel to the resonant capacitance, wherein the resonant converter circuit includes, (i) first and second switches serially connected between a bus conductor and a reference conductor by a common node through which the AC current flows, the first and second switches each including a control node and a reference node, a first voltage between each of the control nodes and the common node determining a conduction state of the switches, and (ii) a voltage-divider network which is connected between the bus conductor and the reference conductor.

10. The circuit of claim 9, further comprising a bidirectional voltage clamp is connected between the control nodes and the common node for limiting positive and negative excursions of the first voltage.

11. The circuit of claim 9, wherein the gate drive arrangement comprises a capacitor which limits a rate of change of the first voltage dependent, at least in part, on the size of the capacitor.

12. The circuit of claim 9, wherein the gate drive arrangement comprises a driving inductor mutually coupled to the resonant inductor in such manner that a second voltage is induced therein which is proportional to an instantaneous rate of change of the AC current.

13. The circuit of claim 12, wherein the gate drive arrangement comprises a second inductor serially connected to the driving inductor, the second inductor and driving inductor being connected between the common node and the control node.

14. The circuit of claim 9, wherein the starting circuit comprises:
  (a) three resistors, the first and second resistors coupled in parallel to the first rectifier and the third resistor coupled in parallel to one of the first and second switches; and
  (b) a blocking capacitor coupled between each of the control nodes and the common node.

15. The circuit of claim 9, further comprising a snubber capacitor, the snubber capacitor shunting the first switch.

16. The circuit of claim 9, further comprising a snubber capacitor, the snubber capacitor shunting the second switch.

17. A power supply circuit for light emitting elements, comprising:
  (a) a resonant load circuit incorporating the light emitting elements and including a resonant inductance, a resonant capacitance, and a capacitor;
  (b) a DC-to-AC converter circuit coupled to the resonant load circuit for inducing an AC current in the resonant load circuit, the converter circuit comprising:
    (1) first and second switches serially connected between a bus conductor at a DC voltage and a reference conductor, and being connected together at a common node through which the AC current flows;
    (2) the first and second switches each comprising a reference node and a control node, the voltage between such nodes determining the conduction state of the associated switch;
    (3) the respective reference nodes of the first and second switches being interconnected at the common node; and
    (4) the respective control nodes of the first and second switches being directly interconnected;
  (c) an inductance connected between the control nodes and the common node;
  (d) a starting pulse-supplying capacitance connected in series with the inductance, between the control nodes and the common node;
  (e) a network connected to the control nodes for supplying the starting pulse-supplying capacitance with charge so as to create a starting pulse; and
  (f) a polarity-determining impedance connected between the common node and one of the bus conductor and the reference conductor, to set the initial polarity of pulse to be generated by the starting pulse-supplying capacitor.

* * * * *